(12) United States Patent
Mahler et al.

(10) Patent No.: US 11,815,617 B2
(45) Date of Patent: Nov. 14, 2023

(54) GENERATION AND USE OF HD MAPS

(71) Applicant: Fraunhofer-Gesellschaft zur Foerderung der angewandten Forschung e.V., Munich (DE)

(72) Inventors: Kim Mahler, Berlin (DE); Thomas Haustein, Potsdam (DE); Marcus Grossmann, Friedrichroda (DE); Kei Sakaguchi, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 762 days.

(21) Appl. No.: 16/460,775

(22) Filed: Jul. 2, 2019

(65) Prior Publication Data
US 2019/0323855 A1    Oct. 24, 2019

Related U.S. Application Data (63) Continuation of application No. PCT/EP2017/084835, filed on Dec. 29, 2017.

(30) Foreign Application Priority Data

Jan. 5, 2017    (EP) .................................. 17150342

(51) Int. Cl.
*G01C 21/36*    (2006.01)
*G06K 9/62*    (2022.01)
(Continued)

(52) U.S. Cl.
CPC ............ *G01S 7/003* (2013.01); *G01C 21/367* (2013.01); *G01C 21/3694* (2013.01);
(Continued)

(58) Field of Classification Search
CPC .. G01S 7/003; G01S 17/89; G01S 2013/9316; G01S 7/4808; G01S 17/931;
(Continued)

(56) References Cited

U.S. PATENT DOCUMENTS 8,880,273 B1    11/2014    Chatham
2010/0106356 A1*    4/2010    Trepagnier ........... G05D 1/0248
                                                                701/25
(Continued)

FOREIGN PATENT DOCUMENTS

CN    101000507 A    7/2007
CN    101446495 A    6/2009
(Continued)

OTHER PUBLICATIONS

"5G Automotive Vision", 5GPPP White Paper, Oct. 20, 2015.
(Continued)

*Primary Examiner* — Nga X Nguyen
(74) *Attorney, Agent, or Firm* — Perkins Coie LLP; Michael A. Glenn (57) ABSTRACT

An apparatus including a processor unit configured to provide a first high-definition map, a sensor unit configured for providing sensor data representing an environmental condition in a periphery of the apparatus and a receiver unit configured to receive data representing a second high-definition map. The processor unit is configured to fuse the second high-definition map and the sensor data so as to provide the first high-definition map. The apparatus further includes a transmitter unit configured for transmitting a result of fusing the second high-definition map and the sensor data, and includes a command generator unit configured to generate a command signal representing a vehicle control command for a vehicle carrying the apparatus based on the first high-definition map.

21 Claims, 7 Drawing Sheets

(51) Int. Cl.
  *G06K 9/00* (2022.01)
  *G06K 9/32* (2006.01)
  *G05D 1/00* (2006.01)
  *G01S 7/00* (2006.01)
  *G01S 17/89* (2020.01)
  *G06V 20/64* (2022.01)
  *G06F 18/25* (2023.01)
  *G01C 21/00* (2006.01)

(52) U.S. Cl.
  CPC .......... *G01C 21/3841* (2020.08); *G01S 17/89* (2013.01); *G05D 1/0088* (2013.01); *G06F 18/25* (2023.01); *G06V 20/64* (2022.01); *G05D 2201/0213* (2013.01)

(58) Field of Classification Search
  CPC .. G01C 21/367; G01C 21/3694; G01C 21/32; G01C 21/3841; G05D 1/0088; G05D 2201/0213; G06K 9/6288; G06V 10/25; G06V 20/64; H04Q 9/00; G08C 21/00; G06F 18/25
  See application file for complete search history.

(56) References Cited

U.S. PATENT DOCUMENTS

| | | |
|---|---|---|
| 2010/0198513 A1 | 8/2010 | Zeng et al. |
| 2014/0358436 A1 | 12/2014 | Kim |
| 2015/0310281 A1 | 10/2015 | Zhu et al. |
| 2016/0028824 A1 | 1/2016 | Stenneth et al. |
| 2016/0061612 A1 | 3/2016 | You et al. |
| 2016/0259814 A1 | 9/2016 | Mizoguchi |
| 2016/0282468 A1 | 9/2016 | Gruver et al. |
| 2016/0377437 A1 | 12/2016 | Brannstrom et al. |
| 2017/0329327 A1* | 11/2017 | Trigui .................. G05D 1/0257 |
| 2018/0190016 A1* | 7/2018 | Yang ....................... G06T 7/593 |

FOREIGN PATENT DOCUMENTS

| | | |
|---|---|---|
| CN | 101799992 A | 8/2010 |
| CN | 104210439 A | 12/2014 |
| CN | 104636763 A | 5/2015 |
| CN | 105022397 A | 11/2015 |
| CN | 105425803 A | 3/2016 |
| CN | 105488498 A | 4/2016 |
| CN | 105675000 A | 6/2016 |
| CN | 106289275 A | 1/2017 |
| CN | 105759295 B | 6/2021 |
| DE | 102014217847 A1 | 3/2016 |
| DE | 102015008879 A1 | 3/2016 |
| DE | 102015001631 A1 | 8/2016 |
| DE | 102015206605 A1 | 10/2016 |
| JP | 2002005672 A | 1/2002 |
| JP | 2014228637 A | 12/2014 |
| KR | 20160040911 A | 4/2016 |
| KR | 20160060277 A | 5/2016 |
| KR | 20170082674 A | 7/2017 |
| WO | 2011116375 A1 | 9/2011 |
| WO | 2016130719 A2 | 8/2016 |
| WO | 2016166791 A1 | 10/2016 |

OTHER PUBLICATIONS

Heiko G. Seif, et al., "Autonomous Driving in the iCity—HD Maps as a Key Challenge of the Automotive Industry," Engineering (2), pp. 159-162, Jun. 2016.
Philippe Gicquel, "Autonomous Vehicles Need Reliable Dynamic Map Data", Geospatial World, Nov. 2015.
"Study on LTE Support for Vehicle to Everything (V2X) Services", 3GPP TR22. 885, V14.0.0, Dec. 2015.
Vutha Va, et al., "Millimeter Wave Vehicular Communications: A Survey", Foundations and Trends@ in Networking, vol. 10, No. 1, pp. 1-113, Jun. 2016.
Laurens Hobert, et al., "Enhancements of V2X Communication in Support of Cooperative Autonomous Driving," IEEE Commun. Mag., vol. 53, No. 12, pp. 64-70, Dec. 2015.

* cited by examiner

GENERATION AND USE OF HD MAPS

CROSS-REFERENCES TO RELATED APPLICATIONS

This application is a continuation of copending International Application No. PCT/EP2017/084835, filed Dec. 29, 2017, which is incorporated herein by reference in its entirety, and additionally claims priority from European Application No. EP 17150342.8, filed Jan. 5, 2017, which is incorporated herein by reference in its entirety.

The present invention concerns the field of wireless communication and, more specifically, an apparatus for generating high definition (HD) maps and methods for generating HD maps, wireless communication networks and vehicles using the HD maps. The invention further concerns HD map delivering networks for autonomous driving.

BACKGROUND OF THE INVENTION

Figure 7:
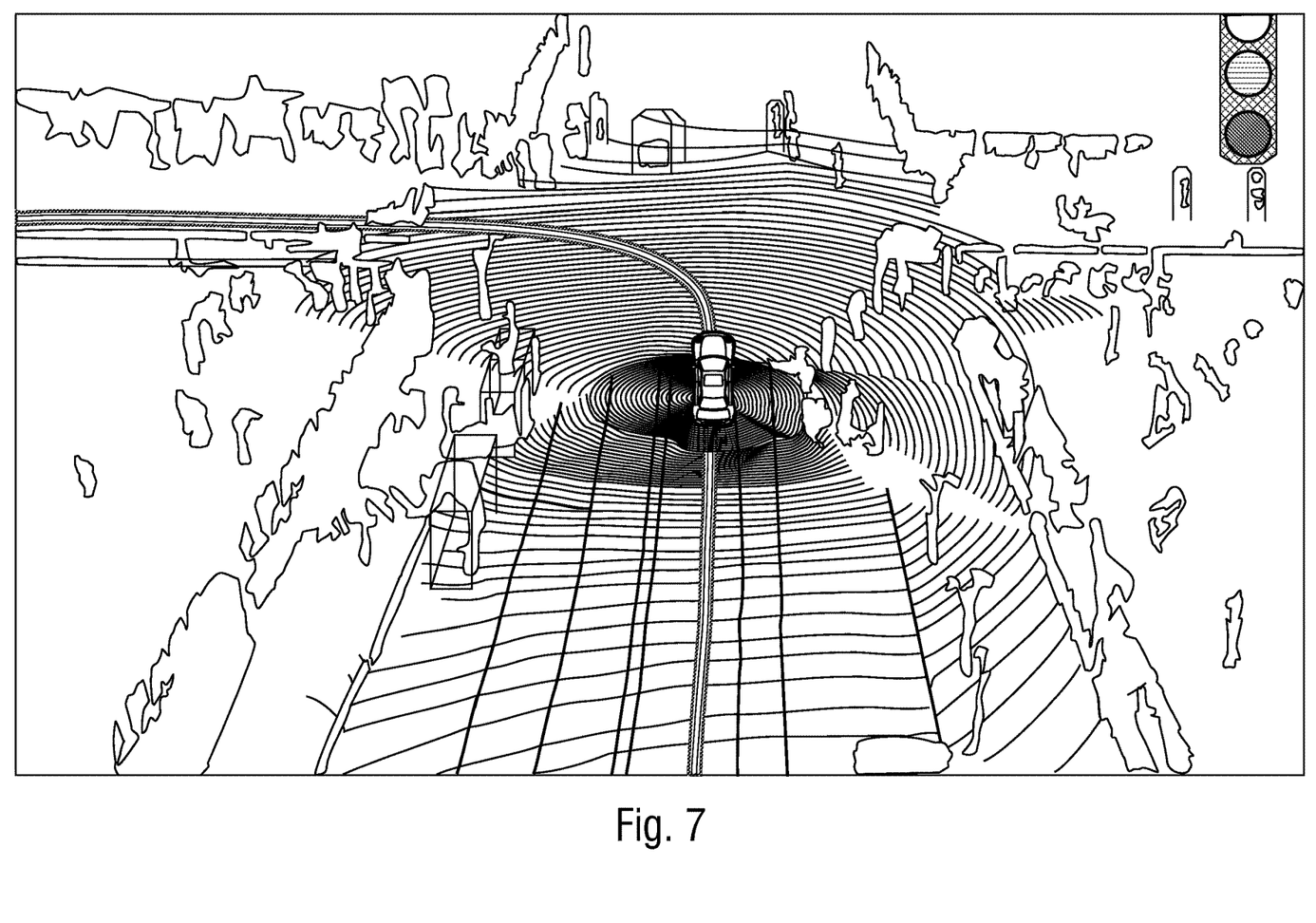
FIG. 7 shows an example of a HD map collected by LiDAR.

Autonomous driving is considered as one of three largest applications in the 5G systems as reported in [1]. For autonomous driving, resolution of current maps for car navigation systems is not enough and a higher resolution and real-time maps are needed as reported in [2]. This kind of new map is called HD (High Definition) map or Dynamic map. FIG. 7 shows an example of a HD map collected by LiDAR (Light Detection and Ranging) which is a laser-based process that senses objects in the near field environment of the car. FIG. 7 shows a point cloud image collected by a LiDAR for an HD map. Technical solutions described herein relate to a CIU and to an RSU and to networks composed of CIUs and/or RSUs to enable autonomous driving by delivering a wide coverage HD map in real-time. A CIU for autonomous driving may comprise an HD sensor unit, e.g., LiDAR, to collect information for HD map, a millimeter wave Rx (receiver) unit to receive HD maps in real-time, e.g., with more than 2.2 Gbps throughput and with less than 10 ms latency from surrounding cars, i.e., other CIUs, and/or RSUs. The CIU may comprise an HD map processing unit to calculate a HD map supporting at least 300 meters ahead by combining multiple HD maps received by RSUs. These CIU may comprise a millimeter wave Tx (transmitter) unit to relay the HD map calculated in a CIU-relay in real-time, e.g., with more than 2.2 Gbps throughput and with less than 10 milliseconds latency, to surrounding cars or RSUs. The CIU may comprise an autonomous driving unit to generate car driving commands for accelerator, brake, steering, etc., based on the HD map calculated in the CIU-relay. In [2], it is reported that the total data size of the HD map for one hour driving becomes about 1 Tbyte which corresponds to 2.2 Gbps date rate. In [2], it is also noted that the latency should be less than 10 ms to receive a frame of a HD map.

The latest 3GPP Release 14 is trying to support V2V (vehicular to vehicular) communications to support road safety services [3]. The 3GPP V2V and related standards such as IEEE802.11p, ETSI CAM and US SAE have been developed to exchange driving information such as emergency, warning, location, speed, etc., between vehicles to assist safe driving. However, due to the limited data rate in the V2V link, the data size that may be exchanged is too small for autonomous driving which may use the huge data size for HD map. Moreover, integration of V2V in all vehicles is problematic due to the longer produce lifecycles of vehicles.

Figure 8:
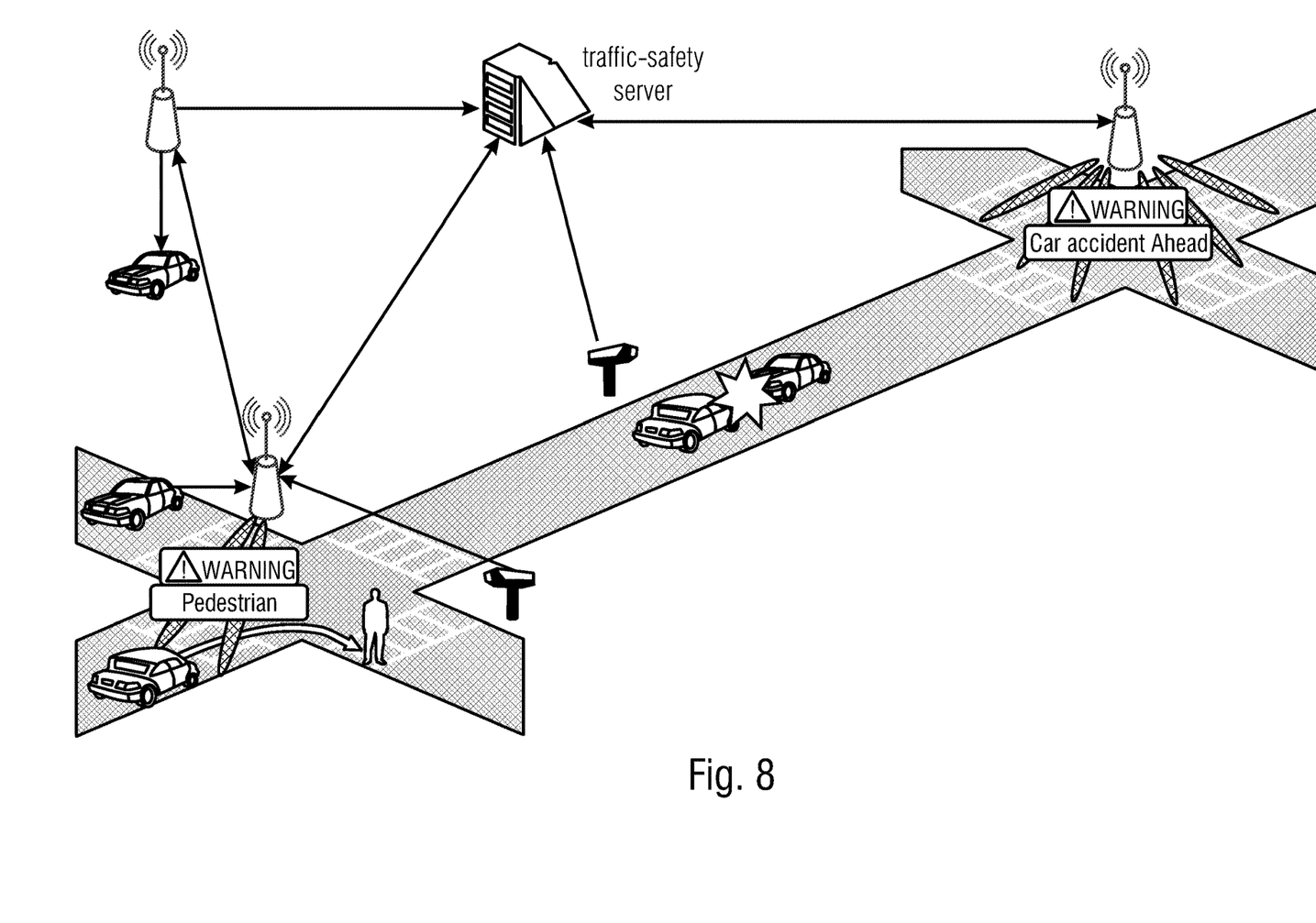
FIG. 8 shows an example of V2X for warning of car accidents and pedestrians crossing roads where RSU (road side units) detect events on the road according to known technology.

The latest 3GPP Release 14 is also trying to support V2X (vehicular to everything) communications to support road safety services via an infrastructure [3]. The 3GPP V2X is an extension of current VICS (vehicle information and communication system) and DSRC (dedicated short range communication) to exchange information about traffic jam, traffic accident, traffic construction, etc., between road and vehicles via infrastructure. FIG. 8 shows an example of V2X for warning of car accidents and pedestrians crossing roads where RSU (road side units) detect events on the road. In FIG. 8, the role of traffic-safety server is to update the traffic map with information of traffic events detected by RSUs and deliver the map to cars located in the same area or city. Since the traffic-safety server is located deep inside the network, the latency of traffic map delivery is much larger than 10 ms.

It has been proposed to combine millimeter-wave car radar and millimeter-wave communication to increase data rate between vehicles by using millimeter-wave technology without increasing the cost of hardware, [4]. In [5], it has been proposed about cooperative sensing and cooperative maneuvering by exchanging the sensing information (e.g., LiDAR information) within a group of cars (convoy) or even from RSUs to solve the problem of blind objects.

Thus, there is a need for improving autonomous driving.

SUMMARY

According to an embodiment, an apparatus may have: a processor unit configured to provide a first high-definition map; a sensor unit configured for providing sensor data representing an environmental condition in a periphery of the apparatus; a receiver unit configured to receive data representing a second high-definition map; wherein the processor unit is configured to fuse the second high-definition map and the sensor data so as to provide the first high-definition map; a transmitter unit configured for transmitting a result of fusing the second high-definition map and the sensor data; and a command generator unit configured to generate a command signal representing a vehicle control command for a vehicle carrying the apparatus based on the first high-definition map.

Another embodiment may have a communication network including a plurality of inventive apparatus, wherein the plurality of apparatus is configured to exchange high-definition maps generated by the plurality of apparatus; wherein at least one apparatus of the plurality of apparatus is configured to fuse the high-definition maps received from other apparatus of the communications network so as to generate a cumulative high-definition map.

According to another embodiment, a RSU may have: a processor unit configured to provide a first high-definition map; a sensor unit configured for providing sensor data representing an environmental condition in a periphery of the RSU; a receiver unit configured to receive data representing a second high-definition map; wherein the processor unit is configured to fuse the second high-definition map and the sensor data so as to provide the first high-definition map; a transmitter unit configured for transmitting a result of fusing the second high-definition map and the sensor data; and wherein the first high-definition map includes map information within a radius of at least 300 m around the RSU.

Another embodiment may have a network including a plurality of inventive RSUs, wherein the plurality of RSUs are located with a distance to each other so as to cover a travelway of a traffic system.

Another embodiment may have a communication network including a plurality of inventive RSUs, wherein the plurality of RSU is configured to exchange high-definition maps generated by the plurality of RSU; wherein at least one RSU of the plurality of RSUs is configured to fuse the high-definition maps received from other RSU of the communications network so as to generate a cumulative high-definition map.

According to another embodiment, a communication network may have: a plurality of inventive apparatus; and a plurality of inventive RSUs; wherein the plurality of apparatus and the plurality of RSU are configured to exchange high-definition maps generated by the plurality of apparatus and by the plurality of RSU; wherein at least one apparatus or at least on RSU of the communication network is configured to fuse the high-definition maps received so as to generate a cumulative high-definition map.

Another embodiment may have a vehicle including an inventive apparatus, wherein the vehicle is configured to move autonomously responsive to the command signal representing the vehicle control command.

The inventors have found out that by combining receive HD maps with own sensor data a control command for a vehicle carrying the respective apparatus may be obtained that is reliable as it comprises information in a region scanned by own sensors and comprises information at regions that are probably unseen by the own sensors but are seen by the received map. Therefore, the scenario involving the command signal is reliable for regions seen and unseen by the apparatus itself. By transmitting the adapted map or the generated map, same reliability may be provided to other apparatuses.

According to an embodiment, an apparatus comprises a processor units configured to provide a first high-definition map, a sensor unit configured for providing sensor data representing an environmental condition in a periphery of the apparatus and a receiver unit configured to receive data representing a second high-definition map. The processor unit is configured to fuse the second high-definition map and the sensor data so as to provide the first high-definition map. The apparatus comprises a transmitter unit configured for transmitting a result of fusing the second high-definition map and the sensor data. The apparatus further comprises a command generator unit configured to generate a command signal representing a vehicle control command for a vehicle carrying the apparatus based on the first high-definition map.

The apparatus may allow for a safe and reliable autonomous driving by fusing external maps with own sensor data, by generating driving commands based on a such refreshed HD map and by redistributing the refreshed maps.

According to an embodiment, a communication network comprises a plurality of apparatuses, wherein the plurality of apparatuses is configured to exchange high-definition maps generated by the plurality of apparatuses. At least one apparatus or the plurality of apparatuses is configured to fuse the high-definition maps received from other apparatuses of the communications network so as to generate a cumulative high-definition map. This may allow for a high-definition map covering a large area or region, i.e., the cumulative high-definition map may comprise a wide coverage range and may further comprise a low rocking problem as the map may be generated based on different view points.

According to an embodiment, a road side unit (RSU) comprises a processor unit configured to provide a first high-definition map. The RSU further comprises a sensor unit configured for providing sensor data representing an environmental condition in a periphery of the RSU and a receiver unit configured to receive data representing a second high-definition map. The processor unit is configured to fuse the second high-definition map and the sensor data so as to provide the first high-definition map. The RSU further comprises a transmitter unit configured for transmitting a result of fusing the second high-definition map and the sensor data. The first high-definition map comprises map information within a radius of at least 300 meters around the RSU. This may allow for road side unit that may provide a highly precise information of a map in a radius around the RSU so as to enable consignments, such as vehicles, of the data to navigate precisely.

According to an embodiment, a network comprises a plurality of RSUs, wherein the RSUs are located with a distance to each other so as to cover a travel way of a traffic system. This may allow for providing information for autonomous driving at local distributed points such that the information is available along the travel way of the traffic system.

According to an embodiment, a communication network comprises a plurality of RSU, wherein the plurality of RSU is configured to exchange high-definition maps generated by the plurality of RSU. At least one RSU of the plurality of RSU is configured to fuse the high definition maps received from other RSUs of the communications network so as to generate a cumulative high-definition map. This may allow for the advantages of the cumulative high-definition map being generated by road side units.

According to an embodiment, a communication network comprises a plurality of aforementioned apparatuses and a plurality of RSUs. The plurality of apparatuses and the plurality of RSUs are configured to exchange high-definition maps generated by the plurality of apparatuses and by the plurality of RSUs. At least one apparatus or at least one RSU of the communication network is configured to fuse the high-definition maps received so as to generate a cumulative high-definition map. Thus, the cumulative high-definition map may cooperatively be generated by apparatuses and RSUs.

According to an embodiment, a vehicle comprises an aforementioned apparatus. The vehicle is configured to move autonomously responsive to the command signal representing the vehicle control command.

BRIEF DESCRIPTION OF THE DRAWINGS

Embodiments of the present invention will be detailed subsequently referring to the appended drawings, in which.

DETAILED DESCRIPTION OF THE INVENTION

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

Embodiments described herein may relate to high-definition maps (HD maps). Such maps may comprise data being acquired of multiple modes of sensor aggregation. This may include but is not limited to geographical data such as rooting information in combination with data relating to objects being present on the roots and/or additional data such as speed limits or the like. The aggregated information may be provided with a high definition, i.e., comprising a resolution of some meters, some decimeters or even some centimeters. HD maps may provide information or may already be a map being used as decametric chart, i.e., it is derivable, along which direction a pathway is obstructed at which distance. Information contained in HD maps may comprise cars, pedestrians, other objects crossing, traffic lights and every other information relevant for traffic.

Some embodiments described herein relate to vehicles. Although vehicles may be described in connection with road vehicles, explanations given herein also apply to airborne vehicles. Like road vehicles, airborne vehicles have to avoid collisions with other objects, have to follow specific rules in traffic and are usually travelling from a starting point to a goal, although using one additional dimension in space.

Some embodiments described herein relate to road side units (RSU), wherein other embodiments described herein may relate to car inside units (CIU). Those terms are used to distinguish between apparatuses that are mountable to vehicles and apparatuses that are configured for a more stated position such as alongside traffic ways. Although using the term "car", this shall not limit embodiments described herein. CIUs may also be mountable to airborne vehicles such as drones in the same way as vehicles described herein are not limited to road vehicles. In addition, RSUs are not limited to be mounted alongside a road, especially when providing data or HD maps for airborne vehicles. RSUs may also be mountable to other points or objects such as roof of a building, a mountain, a tree, a lamppost, may further be mountable to a relatively static air vehicle such as a balloon or any other vehicle. In simple terms, a CIU may be an apparatus for using HD maps for controlling the vehicle, wherein an RSU may be part of an infrastructure supporting the CIU.

Figure 1:
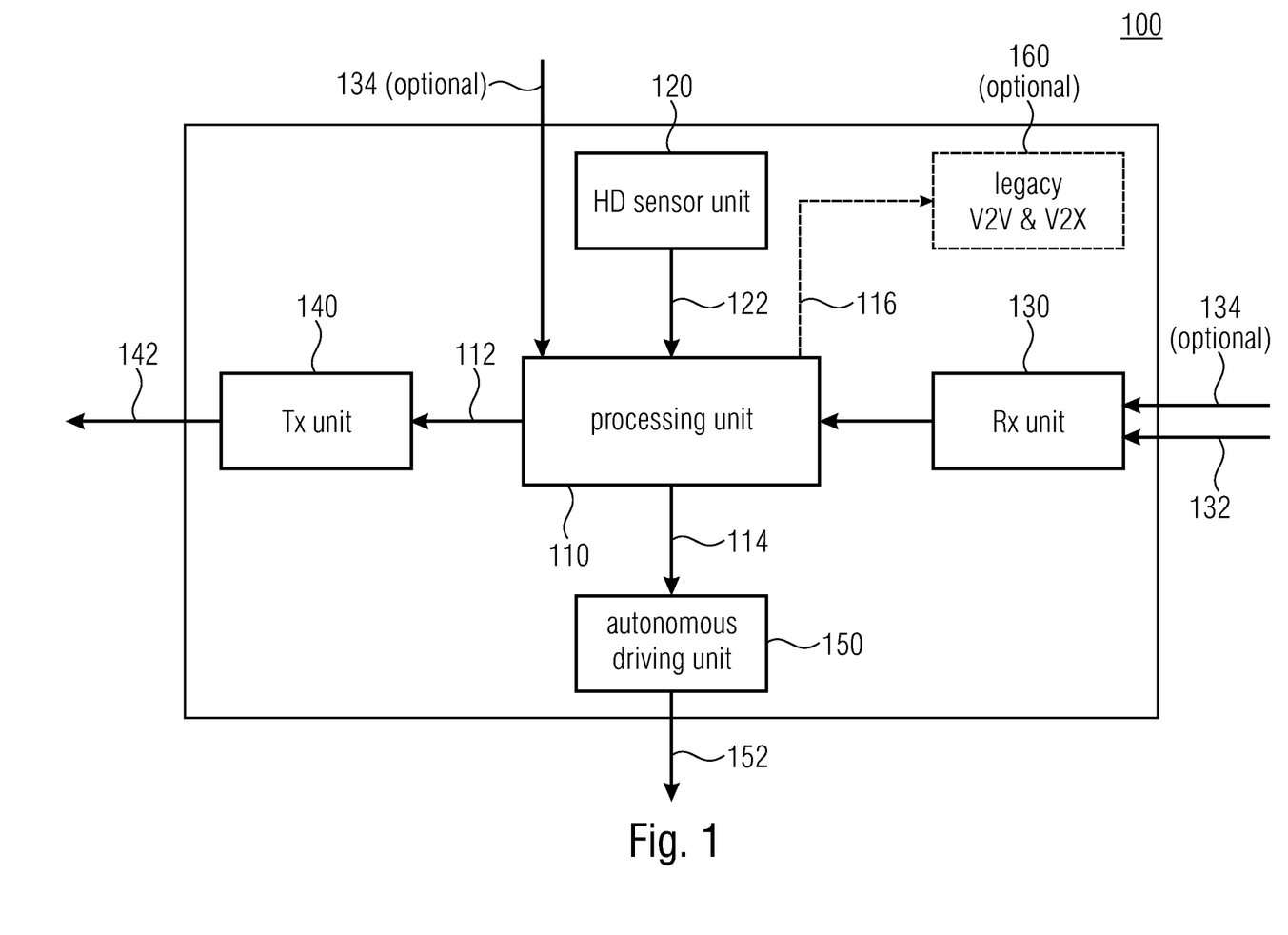
FIG. 1 shows a schematic block diagram of a car inside unit (CIU) according to an embodiment.

FIG. 1 shows a schematic block diagram of a car inside unit (CIU) according to an embodiment. The CIU comprises a processor unit 110 that is configured to provide a high-definition map. The CIU 100 further comprises a sensor unit 120 that is configured for providing sensor data representing an environmental condition in a periphery of the apparatus. For example, the sensor unit 120 may comprise sensors for object detection and ranging such as radar (radio detection and ranging) or LiDAR (light detection and ranging). The environmental condition may be, for example, a distance of the apparatus to adjacent or further objects, a speed of the apparatus, a position of the apparatus in the HD-map and/or in an absolute coordinate system including a height of the apparatus or the like. The sensor data 122 may comprise, for example, information about a size, a speed and/or a position of objects that are sensible or detectable with the sensor unit 120. The sensor unit 120 may be configured to scan the periphery of the apparatus using an imaging technique for providing the sensor data 122. The environmental condition may be a distance to detected objects within the periphery.

The CIU 100 further comprises a receiver unit 130 that is configured to receive data 132 representing a high-definition map provided by an external source such as further CIU and/or a RSU and/or a network comprising a plurality of apparatus being a CIU and/or an RSU.

The processor unit 110 is configured to fuse the received HD map and the sensor data 122 so as to generate and provide the HD map of the CIU 100.

The CIU 140 comprises a transmitter unit 140 that is configured for transmitting a result 112 of the fusing performed by the processor unit 110. The transmitter unit 140 is configured to provide a signal 142 for transmitting the result 112, wherein the signal 142 is a wireless signal.

The CIU 100 further comprises a command generator unit 150 that is configured to generate a command signal 152 representing a vehicle control command for a vehicle carrying the CIU 100. The processor unit 110 is configured to provide information 114 to the command generator 150 such that the command generator unit 150 may derive the command signal 152 based thereon. The information 114 is based on the HD map generated by the processor unit 110. According to one example, the information 114 is the HD map. According to another example, the information 114 corresponds to the result 112. The result 112 is obtained, for example, by modifying information contained in the received HD map by data 122. The HD map received through data 132 may, for example, comprise information about speed or position of other objects in the map. Own sensor data may comprise more accurate data or more actual data such that the processing unit 110 may renew or update data of the received HD map by own sensor data. According to an example, the received HD map covers an area that is wider or larger when compared to a range being sensed with the sensor unit 120. The processing unit 110 may be configured to update or refresh only such areas or data objects in the HD map received for which other data is available. The other data may be generated by the sensor unit 120 or may be received by use of the receiver unit 130 receiving a further HD map. The further HD map may cover an area that is different from the second HD map and/or may have a different time stamp.

The CIU may be configured to determine the command signals 152 based on a so-called basic map. Such a basic map may comprise information about traffic ways such as rivers, streets or the like and may be used, for example, in navigation systems. Such a basic map may be common for a plurality of CIUs or RSUs and may be combined with data of the HD map. The apparatus 100 may be configured to omit transmitting such a basic map as this basic map may be present at the receiving node already. For saving bandwidth and energy, the apparatus may be configured to transmit the result of the fusion of the HD map received by signal 132 and the sensor data 122 in absence of such a basic map. Thus, the HD map 132 received may also be a map in absence of said basic map, wherein the processing unit 110 may be configured to fuse the received high-definition map with the sensor data and with the basic map that is also referred to as a static map. For distributing the relevant, dynamic information it may be sufficient to only distribute, i.e., transmit, the result of the fusing as high-definition map that is fused with a static map at a receiving node.

The command signal 152 may be configured to control a vehicle. The command signal 152 may relate, for example, to a signal indicating the vehicle to brake, to accelerate, to turn, to climb, to sink, to link or the like.

The CIU 100 may be configured to receive further data with the receiver unit 130, the further data representing at least one further HD map and to fuse the received HD maps and the sensor data 122 so as to provide its own HD map.

HD maps transmitted by signal 142 or received by signal 132 may comprise a large amount of data. To receive the large amount of data and/or to transmit the large amount of data, the receiver unit 130 and the transmitter unit 140 are configured to receive a millimeter-wavelength signal to transmit a millimeter-wavelength signal, respectively. As millimeter-wavelength signal a signal may be understood that is transmitted so as to comprise a wavelength being at least 1 millimeter and at most 10 millimeters, which may correspond to a frequency range being at least 30 Gigahertz and at most 300 Gigahertz and allowing for high bit rates to be transmitted. By non-limiting example, the millimeter-wave frequency may be started from 24.25 Gigahertz by considering the radio regulation in the world. The transmitter unit 140 may be configured to transmit the high-definition map with a bit rate that is at least 2 Gbps, at least 2.1 Gbps or at least 2.2 Gbps. For example, a frame size that is at least 2.75 Mbyte may be used as data size per frame for transmitting the high-definition map, in particular when transmitting fused high-definition maps. The processor unit 110 may be configured to provide the high-definition map so as to comprise a data size that is at least 2.75 Mbyte, at least 3.25 Mbyte or at least 3.75 Mbyte.

Furthermore, the processor unit may be configured to generate the HD map in time intervals so as to provide a continuous update of the HD map. A single HD map may then be understood as a frame of an HD map. For example, the processor may be configured to generate HD maps, frames, respectively, with a distance in time therebetween being at most 10 ms, 8 ms or even 7 ms. This may allow for a real-time update of the HD map. Real-time may be understood as providing data early enough such that there is no delay or negative effect at the receiver side by the still present delay. For example, travelling with a speed of 180 kilometers per hour, i.e., 50 meters per second, and receiving or generating the HD map with a distance in time of 10 ms is equal to a movement of a vehicle carrying the CIU of around 0.5 meters. The sensors of the vehicle may sense objects far further, for example at least 10 meters, at least 30 meters or at least 100 meters such that a delay of 0.5 meters or 10 ms may be compensated without any negative effect and may thus be regarded as real-time although having time steps between single frames.

The same at 110 may be configured to generate the high-definition map so as to comprise map information with a radius of at least 300 meters around the CIU.

The CIU 100 may comprise an optional legacy interface 160 being configured to transmit data according to a legacy V2V or V2X communication scheme. For this, the processing unit 110 may be configured to determine or extract details 116 of the data received in connection with the received HD map and/or in connection with the sensor data 122. The processing unit 110 may be configured to bring extracted details 116 such as information relating to road safety services, e.g., traffic jam, traffic accident, traffic construction, etc., into conformity with the communication scheme and to transmit those extracted details 116 according to the communication scheme. In simple terms, the CIU may be compatible with existing communication schemes although this may involve a data conversion.

The processor unit 110 may be configured to generate the high-definition map so as to comprise a same coordinate system when compared to the received HD-definition map 132. This may allow for increasing an area of the map and/or to obtain a cumulative map that may be retransmitted and/or used as a whole.

The CIU 100 may be configured to receive an optional information 134, for example, using the receiver unit 130. The information 134 may comprise information indicating a region of interest in the high-definition map to be generated. The processing unit may be configured to generate the high-definition map so as to comprise a high degree of resolution, i.e., a high degree of information, in the region of interest when compared to a region outside the region of interest. The region of interest may be, for example, a tilt or goal of a vehicle or of the vehicle carrying the CIU. For example, along the route to be travelled by the vehicle, the high-definition map may be generated with a higher degree of resolution when compared to regions or roads aside the route where the vehicle is probably not travelling.

In other words, FIG. 1 shows a block diagram of the CIU. The HD sensor unit collects information for HD map, e.g., by using LiDAR. The millimeter wave Rx unit receives HD maps in real-time, e.g., with more than 2.2 Gbps throughput and with less than 10 ms latency, from surrounding cars and/or RSUs. The HD map processing unit calculates a HD map supporting at least 300 meters ahead by combining multiple HD maps received by the millimeter wave Rx unit. The millimeter wave Tx unit relays the HD map calculated in the HD map processing unit in real-time, e.g., with more than 2.2 Gbps throughput and with less than 10 ms latency, to surrounding cars and/or RSUs. The autonomous driving unit generates car driving commands for accelerator, brake and steering based on the HD map calculated in the HD map processing unit.

Figure 2:
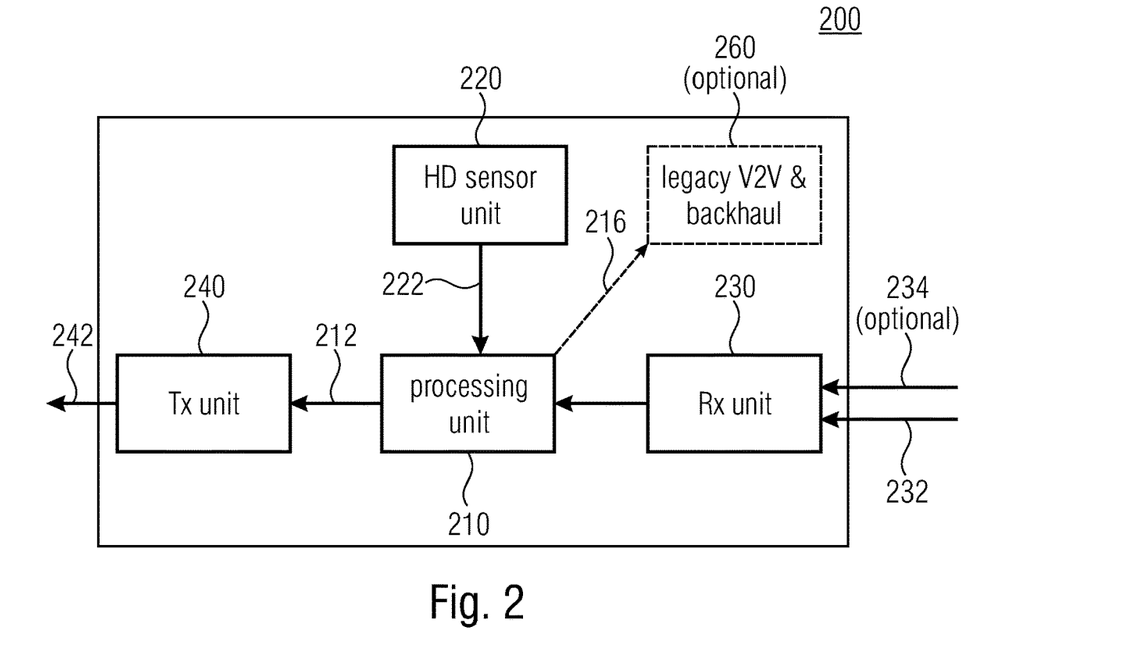
FIG. 2 shows a schematic block diagram of a road side unit (RSU) according to an embodiment.

FIG. 2 shows a schematic block diagram of a road side unit (RSU) according to an embodiment. The RSU 200 may be configured to provide HD maps as described for the CIU 100. In contrast to the CIU 100, the RSU 200 may be implemented without the autonomous driving unit, the command generator 150, respectively. Road side unit 200 may provide HD maps to a vehicle especially in scenarios in which the vehicle carrying the CIU is missing other vehicles to provide for the HD map.

The RSU 200 may comprise a processing unit 210 that may be equal to the processing unit 110 and is configured to provide the HD map. The RSU 200 may comprise a sensor unit 220 that may be equal to the sensor unit 120 and is configured for providing sensor data 222 that may be equal to sensor data 122 and represent an environmental condition in a periphery of the RSU 200. The RSU 200 comprises a receiver unit 230 that may be equal to the receiver unit 130 and may be configured to receive data 232 representing a second, external high-definition map as was described for data 132.

The processor unit 210 is configured to fuse the external high-definition map 232 and the sensor data 222 so as to provide the high-definition map as indicated by signal 212. The RSU 200 comprises a transmitter unit 240 configured for transmitting a result of fusing the second high-definition map and the sensor data 222 by using a signal 242. The result may be, as was explained in connection with CIU 100, an overlay or fusing of HD maps in absence of a stated map. Alternatively, the stated map may also be transmitted which may lead to a more complete data set for the cost of additional data.

The high-definition map transmitted by signal 242 comprises map information within a radius of at least 300 meters around the RSU, of at least 350 meters or at least 400 meters.

As was described for CIU 100, RSU 200 may comprise a legacy interface 260 configured to transmit the extracted details according to a legacy V2X communication scheme and/or to transmit the details 216 to a backhaul network. Thus, a CIU 100, RSU 200 may be configured to communicate to legacy networks, wherein RSU 200 may substitute a vehicle to vehicle communication with a backhaul communication.

Details provided to the communication, transmission or the amount of provided data that are explained in connection with CIU 100 may also apply to RSU 200, i.e., the generated high-definition map may be greater than an area being sensed by the sensor unit 220, receiver unit 230 and transmitter unit 240 may use a millimeter-wavelength for communication, the transmitter unit 240 may be configured for transmitting the high-definition map with a bit rate that is at least 2 Gbps, the high-definition map may comprise a data size that is at least 2.75 Mbyte, at least 3.25 Mbyte or at least 3.75 Mbyte. Furthermore, the processor unit may be configured to generate the high-definition map as a frame of a plurality of frames, two subsequent frames being spaced in time by a distance of at most 10 ms, advantageously 8 ms and, more advantageously, 6 ms.

The sensor unit 220 may use an imaging technique for providing the sensor data 222 as was described for the sensor unit 120, for example the sensor unit 220 may comprise a LiDAR sensor.

When referring to FIG. 1, the received high-definition map 132 may be the high-definition map transmitted by signal 242, i.e., the high-definition map 242. Vice versa, the high-definition map 332 may be the high-definition map 142 transmitted by CIU 100. When taking into account that fusing may also be understood as adapting a portion of the received map, the sensor unit 120 or 220 may be configured to scan the periphery of the respective apparatus 100 or 200 using a LiDAR sensor, wherein the environmental condition may be a distance to detected objects within the periphery. The received high-definition map 132 or 232 may be a map received from a further apparatus, the received high-definition map may comprise information relating to objects in an area of the received high-definition map generated by the respective further apparatus. The processor unit 110, 210, respectively, may be configured to adapt the information relating to one or more of the objects in the received map using the distance between the respective apparatus and the objects detected by the sensor unit 120, 220, respectively, and using an actual position of the apparatus carrying the respective processor unit 110 or 210.

The RSU being possibly similar to the CIU may also be understood that the receiver unit 230 is configured to receive data representing at least a third high-definition map and that the processor unit 210 is configured to fuse the second and third high-definition map and the sensor data so as to provide the first high-definition map. Furthermore, the processor unit 210 may be configured to generate the high-definition map so as to comprise the same coordinate system when compared to the received high-definition map. Furthermore, the processor unit may be configured to fuse the received high-definition map, the sensor data and a static map so as to provide the first high-definition map. The RSU may be configured to not transmit the static map when transmitting a result of fusing the high-definition map and the sensor data.

In other words, FIG. 2 shows a block diagram of the RSU. The HD sensor unit collects information for HD map, e.g., by using LiDAR. The millimeter wave Rx unit receives HD maps in real-time, e.g., with more than 2.2 Gbps throughput and with less than 10 ms latency, from surrounding RSUs and/or cars. The HD map processing unit calculates an HD map supporting at least 300 meters ahead along with a road or roads by combining multiple HD maps received by the millimeter wave Rx unit. The millimeter wave Tx unit relays the HD map calculated with the HD map processing unit in real time, e.g., with more than 2.2 Gbps throughput and with less than 10 ms latency to surrounding RSUs and/or cars. An RSU for autonomous driving may comprise an HD sensor unit, e.g., a LiDAR sensor, to collect information for an HD map. It may further comprise a millimeter wave Rx unit to receive HD maps in real-time, e.g., with more than 2.2 Gbps throughput and with less than 10 milliseconds latency, from surrounding RSUs and/or cars. It may further comprise an HD map processing unit to calculate a HD map supporting at least 300 meters ahead along with road(s) by combining multiple HD maps received by a CIU or RSU. It may further comprise a millimeter wave Tx unit to relay the map calculated in the CIU relay in real-time, e.g., with more than 2.2 Gbps throughput and with less than 10 ms latency, to surrounding RSUs and/or cars (CIUs).

Figure 3:
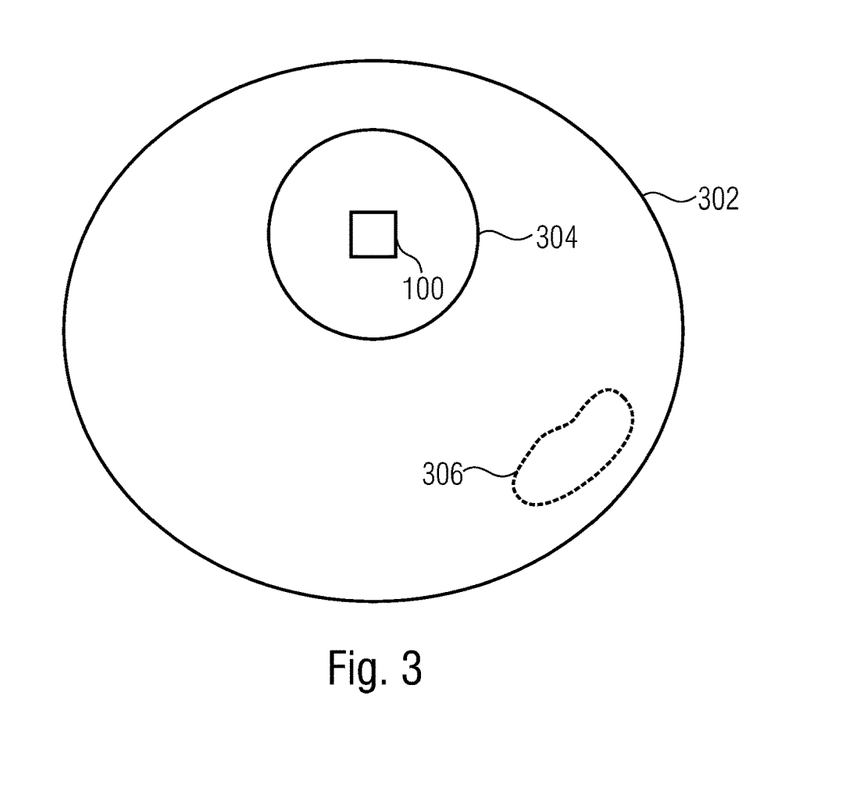
FIG. 3 shows a schematic block diagram of an HD map according to an embodiment.

FIG. 3 shows a schematic block diagram of an HD map 302 that may be received, for example, by the CIU 100 or by the RSU 200. Although FIG. 3 illustrates a presence of the CIU 100, alternatively the RSU 200 may be present. In addition, further CIUs or RSUs, according to embodiments described herein, may be present. The CIU 100 may be configured to scan a periphery 304, for example using the sensor unit 120. When receiving the HD map 302 that may be the HD map 132, the CIU 100 may be configured to adapt the area of the HD map 302 for which it has gained own sensor data. Thus, the area of the high-definition generated by the CIU 100 or the RSU 200 may be greater than an area of the periphery 304.

The HD map may comprise metadata such as time stamps relating to an area or object 306 in the HD map 302. Thus, the processor unit 110 or 210 may be configured to determine an age of the information relating to the area or object 306. Alternatively, the HD map may be generated so as to comprise information indicating an age of other parts of the high-definition map. Using the age of information, the processor unit 110 or 210 may be configured to discount information that comprises an age being above a certain threshold value, i.e., information being aged or too old may be discarded. For example, information relating to an object 306 being a pedestrian crossing a street may be discarded after a certain time when no other CIU or RSU has detected the pedestrian anymore. Simply, the pedestrian may have crossed the street and may have left it. The threshold value for the aging of the information may be different for certain object classes, for example pedestrians, animals or other vehicles may leave a position, wherein it is very likely that buildings or the like will remain at a certain position for a longer time. For example, a threshold value for the aging of information for objects that are considered to move may be, for example, one hour, 30 minutes or 5 minutes or even less. A threshold value for the aging for a class of objects that is considered to be static may be, for example, a month, a week or a day or less.

Figure 4A:
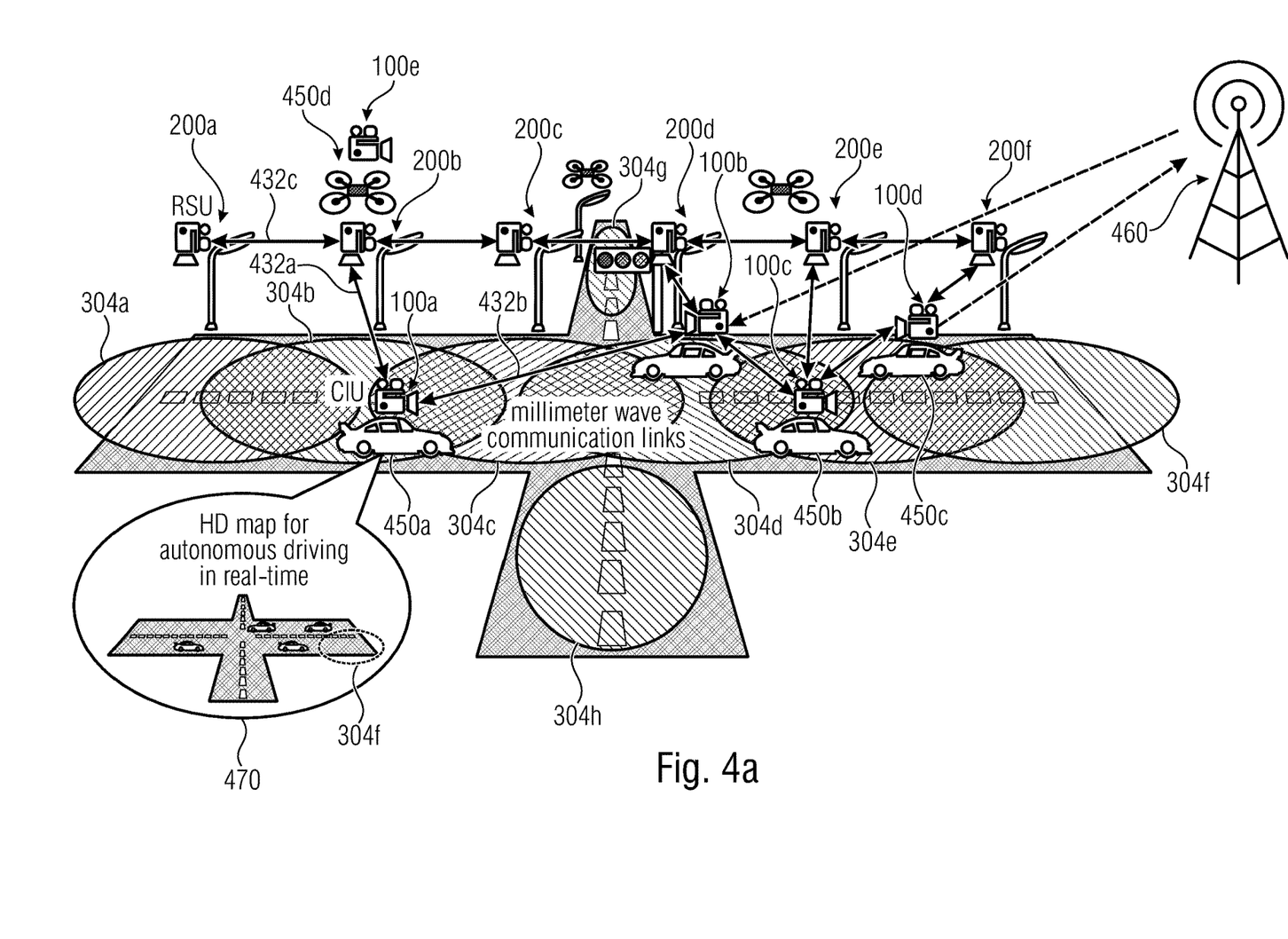
FIG. 4a shows a schematic block diagram of a communication network according to an embodiment.

FIG. 4 shows a schematic block diagram of a communication network 400 comprising a plurality of CIUs 100a to 100e being carried or being mounted to vehicles 450a to 450d that may be, for example, cars or drones. The vehicles may be alternatively any other driven or flown vehicles. The communications network 400 further comprises a plurality of RSU 200a to 200f. Each CIU 100a to 100e and RSU 200a to 200f is associated to a respective periphery 304a to 304h that may overlap partially or completely but may also be spaced from each other. Each of the region 304a to 304h may indicate a coverage of an HD sensor such as a sensor unit 120 or 220. Each CIU 100a to 100e may be configured to communicate with adjacent CIUs and/or adjacent RSUs as indicated by the bidirectional communication links 432a and 432b that may be, for example, the high-definition maps 132, 142, 232 and/or 242.

One or more of the CIUs 100a to 100e and/or RSUs may be configured to communicate to a conventional V2X in current 5 G and/or a backhaul network that receives and/or transmits information indicating a speed, a brake, etc., for the nodes in the network. Each of the CIUs and/or RSU may provide an HD map 470 for autonomous driving and/or flying in real time.

Thus, the plurality of network nodes, i.e., the RSU and the CIU may be configured to exchange high-definition maps 470 generated by a respective node. At least one apparatus of the RSU and/or CIU may be configured to fuse the high-definition maps of the nodes so as to generate a cumulative high-definition map.

As indicated for the HD map 470, although being unable to "see" the periphery 304f, CIU 100a and, therefore, the vehicle 450a may be aware of objects or the like in this area.

This may be achieved by a communication between RSUs as indicated, for example, by the bidirectional communication 432c.

A vehicle 550a to 550d may be configured to move autonomously responsive to the command signal 152 representing the vehicle control command. The CIU mounted to the vehicle 540 may be configured to transmit the generated high-definition map to other CIUs, to communications network structures, to networks, for example networks as described in connection with FIG. 5 and FIG. 6, to further vehicles and/or to an RSU.

In other words, FIG. 4 shows a typical scenario of embodiments described herein. The proposal of embodiments may be to realize autonomous driving of cars or drones. Several cars are implementing or carrying the CIUs described in connection with FIG. 1 to realize autonomous driving by using the HD map calculated by the CIUs. In FIG. 4, the RSUs explained in connection with FIG. 2 are located, for example, on lampposts and traffic signals with distances about, for example, every 100 meters to assist autonomous driving by delivering the HD maps to the CIU equipped cars. Multiple CIUs in nearby cars and multiple RSUs in different lampposts on a road (or roads including intersections) have a function to form local networks to exchange HD map information to widen the coverage of HD maps and to avoid the problem of blocking by combining multiple HD maps measured from different angles (locations). Since useful accuracy of an HD map depend on the distance from the location of interest (i.e., a higher accuracy) may be needed in the area nearer to the target autonomous driving car, the CIU and RSU may support the adaptive resolution reduction of HD maps to be relayed based on the difference of distance from the location of interest. The CIU may support interface to legacy V2V and V2X communication to exchange reduced information such as emergency, warning, location, speed and the like with surrounding vehicles V2V or with a traffic-safety server via V2X. Similarly, the RSU supports interface to legacy by Tx communication and backhaul network connected to the traffic-safety server to exchange reduced information such as emergency, warning, location, speed and the like. Embodiments described herein may be applied to drones flying in a city where autonomous driving may be mandatory. Embodiments may allow for realizing real-time delivery of HD maps, a realization of autonomous driving of vehicles and drones and/or an improvement of road safety services.

In particular, as in some scenarios, a LiDAR sensor may be unable to measure a distance up to 300 meters, a collaboration between different RSUs and/or CIUs may allow for generating maps from at least 300 meters, in particular, in urban city environments with many intersections and blocking objects. Embodiments provide an idea and concept to realize an infrastructure network for delivering HD map information to cars to realize autonomous driving. The concept of described embodiments may also be applied to future traffic systems for drones, where autonomous driving may be mandatory for long distance driving or flying.

Figure 4B:
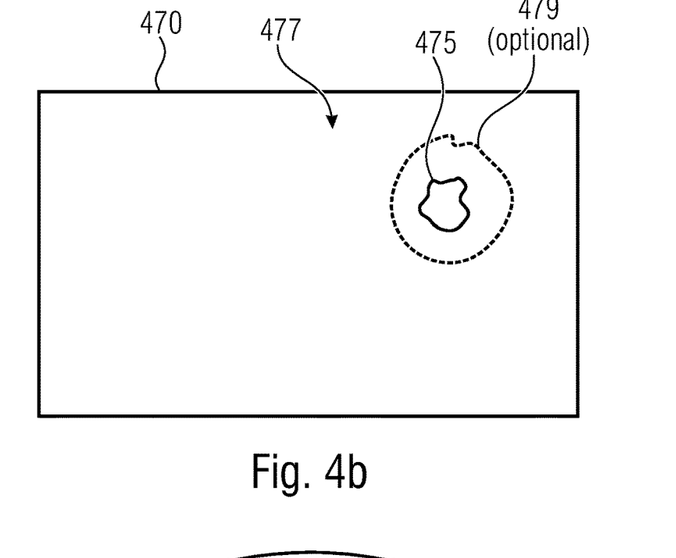
FIG. 4b shows a schematic block diagram of a high-definition map according to an embodiment.

FIG. 4b shows a schematic block diagram of the high-definition map 470 according to an embodiment. The high-definition map 470 may comprise a region of interest 475 related, for example, to a CIU. For example, the CIU or RSU generating the high-definition map 470 may be configured to receive information indicating the region of interest 475 and to generate the high-definition map to be provided to the indicating CIU. In the region of interest, a resolution of the high-definition map 470 may comprise a higher degree when compared to a region 477 outside the region of interest 475. The degree of resolution may relate to a type of objects being represented in the high-definition map but may also relate to a resolution in terms of a precision of an extension of objects in the high-definition map 470. For example, the region 477 apart the region of interest 475 may be arranged with a high distance to the CIU to which the region of interest 475 is related or may be a region through which there is no scheduled travel of the CIU to which the region of interest 475 is related. A presence, position or size of objects such as vehicles on the street at this apart location may be excluded or at least be reduced with respect to the data size in the map so as to obtain a lower data size of the high-definition map 470 in the region 477 when compared to the region of interest 475. The high-definition map 470 may be generated so as to comprise a plurality of regions 475, 477 and optionally 479, i.e., more than two, wherein each region may comprise a different degree of resolution. A degree of resolution in the region of interest 475 may be higher than in the region 477 and/or 479 by a factor of at least 2, at least 3, at least 4 or more. The region of interest may comprise a portion of at most 50% of the high-definition map 470, advantageously of at most 40% or more advantageously of at most 30% of an area of the high-definition map 470.

Figure 5:
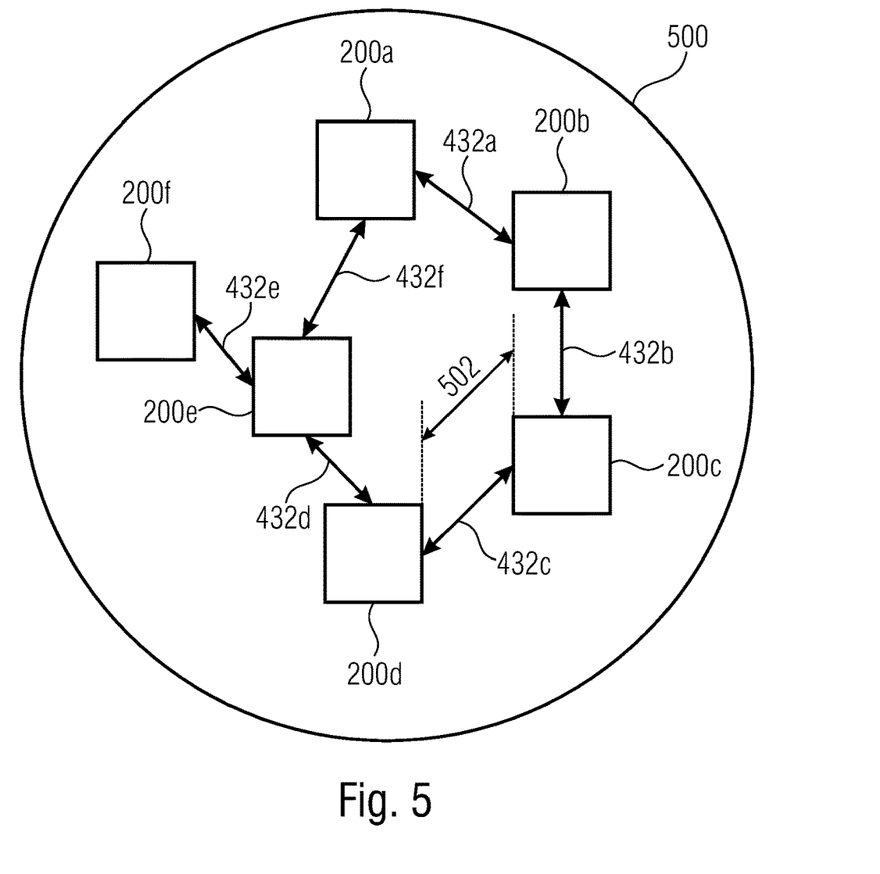
FIG. 5 shows a schematic block diagram of a network comprising a plurality of RSUs, according to an embodiment.

FIG. 5 shows a schematic block diagram of a network 500 comprising a plurality of RSUs 200a to 200f. For example, the RSU 200a to 200f of the communications network 400 may at least partially form the network 500. As illustrated in FIG. 4, the RSUs are located with a distance to each other so as to cover a travel way of a traffic system such as a road or flying routes. The RSUs may communicate with each other according to a transmission range of the bidirectional communication links 432a to 432f. The RSUs may be located with a distance to each other that is at most the sum of the ranges of the sensor units of both RSUs such that the peripheries of the RSUs are essentially gapless, i.e., for each of the point or interval along the travel way information is available for the HD map. For example, a distance 502 between adjacent RSUs may be at most 500 meters, at most 400 meters or at most 300 meters.

The network 500 may alternatively comprise the RSU 200a to 200f, wherein the RSU is configured to exchange high-definition maps generated by the RSU 200a to 200f. At least one RSU 200a to 200f may be configured to fuse the high-definition maps received from other RSUs of the communications network 500 so as to generate a cumulative high-definition map. Thus, when compared to the network 400, the RSU forming the network 500 may generate the cumulative high-definition map.

Figure 6:
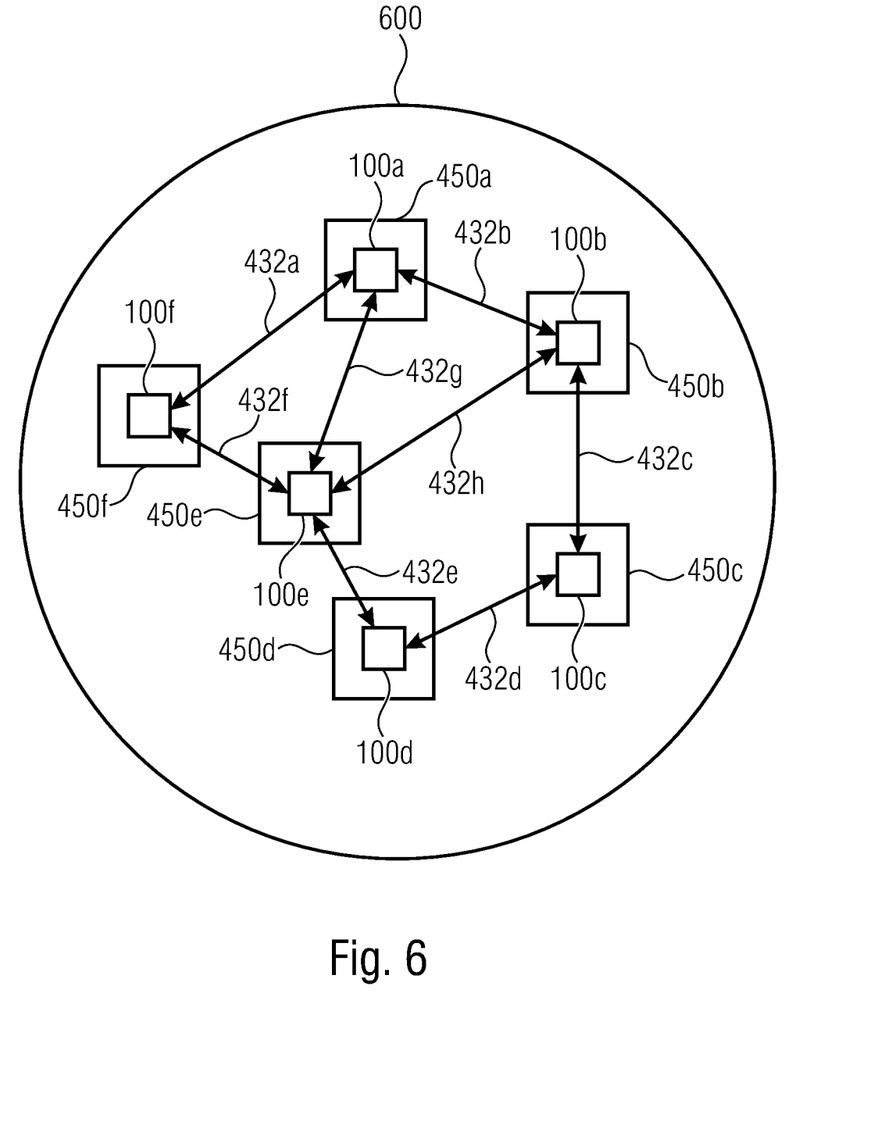
FIG. 6 shows a schematic block diagram of a network comprising a plurality of CIUs, according to an embodiment.

FIG. 6 shows a schematic block diagram of a network 600 comprising a plurality of CIUs 100a to 100f, wherein the CIUs may be mounted or carried, for example, by a vehicle 450a to 450f each. Similar to the communication network 500, the CIU 100a to 100f may communicate with each other by the communication links 432a to 432h so as to exchange high-definition maps generated by the CIUs 100a to 100f. At least one of the CIUs may be configured to fuse the high-definition maps from other apparatuses of the communications network so as to generate a cumulative high-definition map.

Communication and exchange of high-definition maps described in connection with FIG. 4 to FIG. 6 may understood that a network node receiving a high-definition map includes this map to an existing map and further transmits a map thereby obtained to a further node. Thereby, step-by-step, the size of the map may increase and the high-definition map generated by an apparatus may comprise regions that are neither seen by the apparatus transmitting the input map nor by the apparatus generating the high-definition map. In simple terms, a periphery scanned by the sensors of a CIU or RSU may be distributed over large parts of the network or even the complete network.

Even if there are no surrounding CIUs or RSUs present, the then standalone CIU may still perform like an autonomous driving system, i.e., communication with other CIU and/or RSU may be beneficial but is not necessary.

A CIU-relay may relate to a communication network such as the network 600 comprising a plurality or multitude of CIUs to calculate an HD map with wider coverage and less blocking problem by exchanging HD map information between multiple CIUs. An RSU-relay may related to a communication network such as the network 500 comprising a plurality or multitude or RSUs to calculate a HD map with wider coverage and less blocking problem by exchanging HD map information between multiple RSUs. A CIU-RSU-relay may relate to a communication network such as the communications network 400, comprising a plurality or multitude of CIUs and a plurality or multitude of RSUs to calculate a HD map with wider coverage and less blocking problem by exchanging HD map information between multiple CIUs and RSUs. The CIU may be used in the communication networks and comprise a function of adaptive resolution reduction of an HD map to be related based on the difference of distance from the location of interest. This may be referred to as CIU-AdapRes. As RSU-AdapRes a function may be understood, the RSU being used in the communication networks and having a function of adaptive resolution reduction of an HD map to be relayed based on the difference of distance from the location of interest being related to a CIU that requests or receives the high-definition map. I.e., a CIU or RSU may be configured to adapt the resolution of the map being generated based on information indicating the region of interest. In particular, when HD map fusion is performed by CIU or RSU, the data size of a data frame may exceed a size of 2.75 Mbyte. This may result in a data rate of more than 2.2 Gbps, for example, when transmitting data in real time. AdapRes, i.e., providing the high-definition map so as to comprise different regions, the regions comprising different degrees of resolution, may prevent or at least reduce the exceedance of the data size and/or of the data rate. In other words, to ensure the latency of 10 ms, the data size per frame should be less than 2.75 Mbyte in the case of 2.2 Gbps data rate but this data size or data rate may be exceeded, wherein the exceedance may be limited to a tolerable level by reducing the resolution in parts or regions of the maps.

The CIU may comprise an interface to legacy V2V and V2X communication (CIU-legacy) to exchange reduced information such as emergency, warning, location, speed, etc. The RSU may comprise an interface to legacy V2X communication (RSU-legacy) and backhaul network communication, the backhaul network connected to traffic-safety servers to exchange reduced information such as emergency, warning, location, speed, etc. A drone (unmanned air vehicle) may implement or carry the CIU for autonomous driving by exchange HD map information from/to surrounding drones and/or RSUs.

Applications for embodiments described herein may be, for example, autonomous driving or flying for cars and/or drones, road safety services such as collision avoidance and the like and/or may be in the range of a smart city, i.e., navigation, city guide, car parking and the like.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LITERATURE

[1] "5G Automotive Vision," 5GPPP White Paper, Oct. 20, 2015.
[2] Heiko G. Seif, Xiaolong Hu, "Autonomous Driving in the iCity—HD Maps as a Key Challenge of the Automotive Industry," ELSEVIER, Engineering, pp. 159-162, June 2016.
[3] Philippe Gicquel, "Autonomous Vehicles Needs Real-time Dynamic Map Data," Geospatial World, November 2015.
[4] "Study on LTE Support for Vehicle to Everything (V2X) Services," 3GPP TR22. 885, V14.0.0, December 2015.
[5] V Va. T. Shimizu, G. Bansal and R. W. Heath Jr., "Millimeter Wave Vehicular Communications: A Survey," Foundations and Trends® in Networking, vol. 10, no. 1, pp. 1-113, June 2016.
[6] L Hobert, A. Festag, I. Llatser, L. Altomare, F. Visintainer, A. Kovacs, "Enhancements of V2X Communication in Support of Cooperative Autonomous Driving," IEEE Commun. Mag., vol. 53, no. 12, pp. 64-70, December 2015.

The invention claimed is:

1. An apparatus comprising:
a processor unit configured to provide a first high-definition map;
a sensor unit configured for providing sensor data representing an environmental condition in a periphery of the apparatus;
a receiver unit configured to receive data representing a second high-definition map;
wherein the processor unit is configured to fuse the second high-definition map and the sensor data so as to provide the first high-definition map;
a transmitter unit configured for transmitting a result of fusing the second high-definition map and the sensor data; and a command generator unit configured to generate a command signal representing a vehicle control command for a vehicle carrying the apparatus based on the first high-definition map; wherein the processor unit is configured to update or refresh a part of the second high-definition map in the first high-definition map for which other data is available;
wherein the processor unit is configured to receive information indicating a region of interest in the first high-definition map and to provide the first high-definition map so as to comprise a first degree of resolution in the region of interest and to comprise a second degree of resolution in a region outside the region of interest, wherein the first degree of resolution is higher than the second degree of resolution,
wherein the receiver unit is configured to receive the second high-definition map using a millimeter-wavelength signal and/or to transmit the first high-definition map using the millimeter-wavelength signal.

2. The apparatus of claim 1, wherein the receiver unit is configured to receive data representing at least a third high-definition map;
wherein the processor unit is configured to fuse the second high-definition map, the third high-definition map and the sensor data so as to provide the first high-definition map.

3. The apparatus of claim 1, wherein an area of the first high-definition map is greater than an area of the periphery.

4. The apparatus of claim 1, wherein the first degree is higher than the second degree by a factor of at least 2.

5. The apparatus of claim 1, wherein the region of interest comprises a portion of at most 50% of the first high-definition map.

6. The apparatus of claim 1, wherein the transmitter unit is configured for transmitting the first high-definition map with a bitrate that is at least 2 Gbps.

7. The apparatus of claim 1, wherein the processor unit is configured to generate the first high-definition map as a frame of the first high-definition map, wherein the processor unit is configured to generate a plurality of frames of the first high-definition map, wherein the processor unit is configured to generate the plurality of frames with a distance in time that is at most 10 ms.

8. The apparatus of claim 1, wherein the processor unit is configured to generate the first high-definition map comprising a data size that is at least 2.75 Mbyte.

9. The apparatus of claim 1, wherein the processor unit is configured to generate the first high-definition map so as to comprise map information within a radius of at least 300 m around the apparatus.

10. The apparatus of claim 1, wherein the sensor unit is configured to scan the periphery of the apparatus using an imaging technique for providing the sensor data, wherein the environmental condition is a distance to detected objects within the periphery.

11. The apparatus of claim 1, wherein the sensor unit comprises a LiDAR sensor.

12. The apparatus of claim 1, wherein the processor unit is configured to determine a portion of details of the first high-definition map relating to a traffic parameter of the apparatus in the first high-definition map, wherein the apparatus comprises a legacy interface configured to transmit the portion of details according to a legacy V2V or V2X communication scheme.

13. The apparatus of claim 1;
wherein the sensor unit is configured to scan the periphery of the apparatus using a LiDAR sensor, wherein the environmental condition is a distance to detected objects within the periphery;
wherein the second high-definition map is a map received from a further apparatus, the second high-definition map comprising information relating to objects in an area of the second high-definition map generated by the further apparatus; and
wherein the processor unit is configured to adapt the information relating to the objects using the distance between the apparatus and the objects detected by the sensor unit and using an actual position of the apparatus.

14. The apparatus of claim 1, wherein the processor unit is configured to generate the first high-definition map to comprise a same coordinate system when compared to the second high-definition map.

15. The apparatus of claim 1, wherein the processor unit is configured to fuse the second high-definition map, the sensor data and a static map so as to provide the first high-definition map, wherein the apparatus is configured to not transmit the static map when transmitting a result of fusing the second high-definition map and the sensor data.

16. The apparatus of claim 1, wherein the processor unit is configured to generate the first high-definition map so as to comprise information indicating an age of information of the first high-definition map, wherein the processor unit is configured to discount aged information in the second high-definition map when providing the first high-definition map, the aged information comprising an age above a threshold value.

17. A communication network comprising a plurality of apparatus according to claim 1, wherein the plurality of apparatus is configured to exchange high-definition maps generated by the plurality of apparatus;
wherein at least one apparatus of the plurality of apparatus is configured to fuse the high-definition maps received from other apparatus of the communications network so as to generate a cumulative high-definition map.

18. A vehicle comprising an apparatus according to claim 1, wherein the vehicle is configured to move autonomously responsive to the command signal representing the vehicle control command.

19. The vehicle of claim 18, wherein the vehicle is a road vehicle or an unmanned air vehicle.

20. The apparatus of claim 1, wherein the receiver unit is configured to receive the second high-definition map using a millimeter-wavelength signal.

21. The apparatus of claim 1, wherein the processor unit is configured for storing a result of fusing the second high-definition map and the sensor data in a memory.

* * * * *